United States Patent Office 3,400,107
Patented Sept. 3, 1968

3,400,107
CARBOHYDRATE DERIVED POLYMERS
William A. P. Black, Falkirk, Eric T. Dewar, Dalkeith, and David Rutherford, Edinburgh, Scotland, assignors to the United States of America as represented by the Secretary of Agriculture
No Drawing. Original application Sept. 20, 1962, Ser. No. 225,168, now Patent No. 3,225,012, dated Dec. 21, 1965. Divided and this application June 16, 1965, Ser. No. 527,998
13 Claims. (Cl. 260—80)

ABSTRACT OF THE DISCLOSURE

The invention describes the synthesis of novel monomeric isopropylidene-protected methacrylates containing reactive hexitol residues and the formation of the corresponding water soluble polymers that are readily deacetonated to give metal ion sequestering sugar acid containing polymethacrylates.

---

This application is a division of application S.N. 225,168 filed Sept. 20, 1962, now U.S. Patent No. 3,225,012 which was a continuation-in-part of now abandoned application S.N. 140,618 filed Sept. 25, 1961.

This invention relates to several classes of polymeric materials having exceptional commercial promise. More particularly, our invention relates in one major aspect to optically active polymethacrylate polymers containing substituted or unsubstituted hexitol residues and more particularly such residues of D-glucose, D-glucitol, D-mannitol, L-iditol, galactitol and the corresponding mono and dicarboxylic acids, residues, which polymethacrylate polymers are easily converted into a novel type of water-soluble methacrylate containing a hydrocarbon backbone having potential free aldehyde-containing glucose residues attached to every other carbon atom. This water-soluble polymethacrylate gives rise to derivatives of commercial promise by chemical treatment, for example by reduction, oxidation, acetylation, methylation, carbanilation, and phenylhydrazone and diphenylformazan formation. Our novel polymethacrylate may have advantages over natural glucose polymers, such as starch and cellulose, in being more reactive and less readily attacked by microorganisms.

The second major aspect of our invention relates to optically active, high-viscosity polyvinyl ethers containing the above described substituted hexitol residues, which polyvinyl ethers can be converted into water-soluble polymers that contain a hydrocarbon backbone having potential free aldehyde-containing glucose residues attached to every other carbon atom. Such water-soluble polyvinyl ethers would be expected to have all the desirable properties of the above-mentioned polymethacrylate, and in addition should be even more stable because the glucose residues are attached to the hydrocarbon backbone by ether linkages in the polyvinyl ether in contrast to ester linkages in the polymethacrylate.

The third major aspect of our invention relates to the practical preparation of nylon-type polyamides containing the aforesaid carbohydrate residues, which carbohydrate-containing polyamide polymers are not subject to the prior art handicaps of substantial darkening of the product during polymerization and do not develop the excessive brittleness that prevents the "cold drawing" of fibers thereof.

Although the general polymerization of glucose and other carbohydrates with acidic catalysts has been extensively studied, only a few specific carbohydrate monomers containing functional groups capable of polymerization in a given direction to give polymers of particular interest have been prepared. One method of polymerizing substituted carbohydrates is by introducing a vinyl-type group into the monomer, which may then be capable of polymerizing to give a long hydrocarbon chain with sugar residues attached to alternate carbon atoms. Reppe et al., U.S. 2,157,347 polymerized 2,3:4,5-di-O-isopropylidene-1-O-vinyl-D-fructose to a low-molecular weight resinous product soluble in organic solvents. Mikhant'ev et al., Zhur. Obshch. Khim., 27, 2840 (1957), prepared 1,2:5,6-di-O-isopropylidene-3-O - vinyl - α - D - glucofuranose by a high-temperature reaction between diisopropylidene-glucose and acetylene, but they did not attempt to polymerize this monomer. Whistler et al., Jour. Org. Chem., 26, 1583 (1961) prepared 1-acrylamido- and 1-methacryl-amido-1-deoxy-D-glucitol and polymerized the monomers to give vinyl-type polymers containing hydrophilic sugar residues. Haworth et al., Jour. Chem. Soc., 488 (1946) polymerized 1,4:3,6 - dianhydro - 2,5-di-O-methacryloyl-D-mannitol and 1,4:3,6-dianhydro - 2,5 - di - O - methacryloyl-D-glucitol at 80° without a catalyst to infusible, insoluble resins. They also found that the 1,6-di-O-acryloyl and methacryloyl esters of 2,4:3,5-di-O-methylene-D-mannitol and di-O-methylene-D-glucitol behaved similarly. Wolfrom et al., Jour. Amer. Chem. Soc., 81, 5701 (1959) prepared 3-O-acryloyl-D-mannitol pentanitrate which polymerized with benzoyl peroxide to form a low-molecular-weight, gummy polymer. The 3-O-methacryloyl ester polymerized spontaneously to a hard solid.

Haworth et al., Jour. Chem. Soc., 155 (1944), attempted to prepare polyamide fibers by condensing 1,6-di-amino-1,6-dideoxy-2,4:3,5-di-O-methylene-D-mannitol at 210° to 250° C. with a dibasic acid such as oxalic, adipic, sebacic, and di-O-methylene-L-idaric acid, but the condensation products were darkly colored, and the fibers drawn from the melt were brittle and could not be "cold drawn." Hamamura et al., Jour. Agr. Chem. Soc., Japan, 18, 1092 (1942), unsuccessfully tried to prepare polyamides with 1,6-diaminodimethylenemannitol. Wiggins, Jour. Chem. Soc., 384 (1946), reacted 1,2:5,6-dianhydro-3,4-O-isopropylidene-D-mannitol at 150° to 160° C. with 1,6-diaminodimethylenemannitol, but the resin which formed was of little interest because of its insolubility. Wolfrom et al., Jour. Amer. Chem. Soc., 80, 6328 (1958), prepared hydroxy-polyamides by condensing tetra-O-acetylgalactaroyl dichloride with ethylenediamine or piperazine but the acetylated polyamides were insoluble in common organic solvents and decomposed above 250° without melting. Butler et al., British Patent 750,822 have formed linear polyamides by condensing a diamine at high temperature with di-O-methylene-, di-O-ethylidene- and di-O-isopropylidene-galactaric acid.

A principal object of our invention is to the preparation of the 3-O-methacryloyl ester of 1,2:5,6-di-O-isopropylidene-α-D-glucofuranose and related sugars for polymerization. Another object is the preparation of pure 3-O-vinyl ether of 1,2:5,6-di-O-isopropylidene-α-D-glucofuranose for polymerization to a high-viscosity polyvinyl ether. Another object is the preparation of nylon-type polyamides. Another object is the preparation of 1,6-diamino-1,6-dideoxy - 2,4:3,5 - di - O - methylene - D-glucitol dihydrochloride, 1,6-diamino-1,6-dideoxy-2,4:3,5-di-O-methylene-L-iditol and its dihydrochloride, 1,6-diamino-di-O-benzylidene-1,6-dideoxygalactitol, and 1,6-diamino-1,6-dideoxy-di-O-isopropylidenegalactitol, which novel compounds are essential intermediate in the formation of high-viscosity, nylon-type polyamides. Another object is the preparation of 2,4:3,5-di-O-methylene-D-glucaroyl dichloride and 2,4:3,5 - di - O - methylene-L-idaroyl dichloride, these compounds also being essential intermediates in the formation of high-viscosity nylon-type polyamides. Still another object is an improved method of forming the above nylon-type polyamides that avoids any injurious or destructive thermal effects on the formed polyamide. The above and related objects will become fully apparent from a reading of the examples and appended claims.

In the instant invention we have prepared synthetic linear high-viscosity carbohydrate polyamides by the interfacial polycondensation of a substituted diamino-dideoxy sugar alcohol derived from hexose sugar alcohols such as D-mannitol, D-glucitol (sorbitol), L-iditol, or galactitol (dulcitol) and a dibasic acid chloride, e.g., sebacoyl, adipoyl or terephthaloyl chloride, or by a similar polycondensation of a substituted sugar dicarboxylic acid chloride, such as a hexaroyl dichloride derived from a sugar acid such as D-glucaric (saccharic) acid, L-idaric acid, or galactaric (mucic) acid, with either any ordinary diamine such as hexamethylenediamine or decamethylenediamine, or with one of the above substituted diamino-dideoxy sugar alcohols.

Representative of the substituted diamino-dideoxy sugar alcohols which are operative in preparing the improved and useful nylon-type polyamides of our invention are:

1,6-diamino-1,6-dideoxy-di-O-methylene-D-mannitol
1,6-diamino-1,6-dideoxy-di-O-methylene-D-glucitol
1,6-diamino-1,6-dideoxy-di-O-methylene-L-iditol
1,6-diamino-1,6-dideoxy-di-O-methylenegalactitol
1,6-diamino-di-O-benzylidene-1,6-dideoxygalactitol
1,6-diamino-1,6-dideoxy-di-O-isopropylidenegalactitol.

Similarly, representative carbohydrate-derived diacid chlorides include:

Di-O-methylene-D-glucaroyl dichloride
Di-O-methylene-L-idaroyl dichloride
Di-O-methylenegalactaroyl dichloride
Tetra-O-acetylgalactaroyl dichloride.

The selected diamine or its dihydrochloride is dissolved in water containing the required amount of alkali and reacted with the diacid chloride in a water-immiscible solvent as taught by Magat, et al., U.S. 2,708,617 and 2,831,834.

Where the hydroxyl-protecting groups in the substituted diamino-dideoxy sugar alcohol are methylene residues, as in 1,6-diamino-1,6-dideoxy-di-O-methylene-D-mannitol,
1,6-diamino-1,6-dideoxy-di-O-methylene-D-glucitol,
1,6-diamino-1,6-dideoxy-di-O-methylene-L-iditol, and
1,6-diamino-1,6-dideoxy-di-O-methylenegalactitol, these methylene residues cannot be removed after the polycondensation without decomposing the polymer, but where the protecting groups are isopropylidene residues, as in 1,6 - diamino - 1,6 - dideoxy - di - O - isopropylenegalactitol whose preparation is a principal object of this invention, these can be removed after polycondensation by mild acid treatment to give a linear, insoluble, infusible tetrahydroxy-nylon, which has exceptional commercial promise.

The diamines synthesized from D-mannitol, D- glucitol, and L-iditol, and the substituted D-glucaroyl and L-idaroyl dichlorides, all give rise to optically active polyamides which may have special utility as light-filter components.

EXAMPLE 1

1,2:5,6-di-O-isopropylidene-3-O-methacryloyl-α-D-glucofuranose

Diisopropylideneglucose (20 g.) in dry pyridine (100 ml.) was heated at 65° C. for 3.5 hours with methacrylic anhydride (20 ml.); water (50 ml.) was then added, and the mixture was heated for a further hour with stirring. After standing overnight at 30° C., the reaction mixture was extracted with three 100 ml. portions of petroleum ether (B.P. 30–40°) and the petroleum extracts were washed with three 100 ml. portions of 5 percent sodium hydroxide solution, and then with water. The extracts were dried over sodium sulphate, tetrachlorohydroquinone (20 mg.) added, the solution concentrated, and the resulting syrup was distilled twice to give a pure monomeric product as a colorless, viscous syrup which slowly crystallized, M.P. 34–35° C. The yield varied from 50 to 70 percent in different preparations. B.P. 120° C./0.20 mm. Hg; $n_D^{18}$ 1.4614; $[\alpha]_D^{25}$ −37.0° in ethanol, −40.0° in chloroform, and −32.2° in tetrachloroethane (c., 1).

Analysis.—$C_{16}H_{24}O_7$ requires C, 58.51; H, 7.37; $CH_2=C(CH_3)CO$, 21.03%. Found: C, 57.7; H, 7.22; $CH_2=(CH_3)CO$, 19.7. The monomer showed no OH absorption at 3400 cm.$^{-1}$ in the infrared.

EXAMPLE 2

Poly(1.2:5,6-di-O-isopropylidene-3-O-methacryloyl-α-D-glucofuranose)

The pure monomer of Example 1 (40.84 g.) was polymerized in benzene (41 ml.) in a nitrogen atmosphere by heating at 70° C. for 24 hours in the presence of azobisisobutyronitrile (408 mg.). Further benzene (41 ml.) was then added and the acetonated polymer was precipitated by pouring the viscous solution into 2 liters of methanol with stirring. The solid was centrifuged, redissolved in boiling benzene (80 ml.), and precipitated with 2 liters of methanol to give 31.21 g. (76.4% yield) of a white polymer with the following characteristics: M.P. 214–218° C.; $[\alpha]_D^{27}$ −47.6° in tetrachloroethane (c., 0.5).

Analysis.—$(C_{16}H_{24}O_7)_n$ requires C, 58.51; H, 7.37%. Found: C, 58.32, H, 7.25. The inherent viscosity, $\eta_{inh.}=c.^{-1} \ln (\eta_{soln.}/\eta_{solv.})$, of a solution of the polymer tetrachloroethane was 0.50 dl./g. (c., 0.5 g./100 ml.; 25° C.). The polymer was soluble in chlorinated hydrocarbons and benzene but insoluble in alcohol and water.

EXAMPLE 3

Poly(3-O-methacryloyl-D-glucopyranose)

20 g. of the polymer of Example 2 was hydrolyzed for 2 hours in 400 ml. of 1 N HCl at 100° with rapid stirring, the acetone being allowed to escape from the reaction flask. Insoluble material was removed at the centrifuge, washed with water, and the solution and washings neutralized with 4 N sodium hydroxide solution. The solution was dialized against tap-water overnight to remove chloride, filtered through kieselguhr, the filtrate concentrated to 100 ml., and poured into 670 ml. ethanol. The polymer was separated by centrifugation, washed with ethanol and ether, and dried over $P_2O_5$ to a white powder (11.21 g.). Yield, 74.1%. $[\alpha]_D^{23}$ +49.8° in water (c., 0.5). The inherent viscosity was 0.42 in water.

Analysis.—$(C_{10}H_{16}O_7)_n$ requires C, 48.38; H, 6.50%. Found: C, 48.1; H, 6.39. The polymer was strongly reducing as a result of carbon atom 1 of the glucose residue being free.

EXAMPLE 4

Poly(3-O-methacryloyl-D-glucitol)

79.7 mg. of the polymer of Example 3 was reduced with sodium borohydride (25.6 mg.) in 8 ml. water, the reaction being allowed to proceed for 23 hours at 20° C. The final specific rotation of the solution was +3.5°. The solution was made slightly acid with 2 N acetic acid, concentrated to 5 ml., and poured into 28 ml. ethanol. The reduced polymer was separated by centrifugation, washed with ethanol and ether, and dried over $P_2O_5$ to a white powder (61.4 mg.). Yield, 76.5%.

EXAMPLE 5

Poly(3-O-methacryloyl-D-gluconic acid)

508.5 mg. of the polymer of Example 3 was dissolved in 4 M acetic acid (25 ml.), M sodium chlorite (20 ml.) added, the solution made up to 50 ml., and the reaction allowed to proceed for 26 hr. at 20°. The solution was dialyzed against running water overnight to remove excess chlorite and acetic acid, concentrated to small volume, passed through an Amberlite resin IR-120-H column to remove cations from the polyacid, and the eluate and washings freeze-dried to give the polyacid as a white solid (491 mg.). Yield, 90.7%. The product contained 83.2% of the theoretical carboxyl content.

This polyacid was readily converted into its sodium salt. The above white solid (98.7 mg.) was dissolved in 0.01 N sodium hydroxide (50 ml.), the excess alkali neutralized exactly with 0.01 N sulphuric acid, and the solution dialyzed against distilled water to remove sodium sulphate. The filtered dialyzate was freeze-dried to give the sodium salt as a white solid (78 mg.). Yield, 73%. $[\alpha]_D$ +3° in water (c., 0.45). The inherent viscosity was 0.47 in water.

*Analysis.*—$(C_{10}H_{15}O_8Na)_n$ requires Na, 8.0%. Found: Na, 8.0. The properties of this salt resembled those of sodium alginate. For example, its solution in water was notably viscous and it gave insoluble precipitates with various polyvalent cations, including calcium, barium, cupric, lead, ferrous, nickel, cobalt, ferric and aluminum.

EXAMPLE 6

Poly(1,2:4,6-tetra-O-acetyl-3-O-methacryloyl-D-glucopyranose)

To 997 mg. of the polymer of Example 3 dissolved in 50 ml. dimethylformamide were added acetic anhydride (12 ml.) and pyridine (6 ml.), and the solution kept at 20° C. for 24 hours and then poured into water. The product which separated was purified by solution in chloroform (15 ml.) and reprecipitation with 150 ml. petroleum ether (B.P. 40–60°). The tetra-acetate was centrifuged and dried to a white powder (1.32 g.). Yield, 79.0%. $[\alpha]_D^{21}$ +43.4° in tetrachloroethane (c., 0.5). The inherent viscosity was 0.38 in tetrachloroethane.

*Analysis.*—$(C_{18}H_{24}O_{11})_n$ requires C, 51.93; H, 5.81; $CH_3CO$, 41.36%. Found: C, 51.3; H, 6.20; $CH_3CO$, 41.2.

EXAMPLE 7

Methylation of poly(3-O-methacryloyl-D-glucopyranose)

To 97.9 mg. of the polymer of Example 3 dissolved in dimethylformamide (4 ml.), methyl iodide (1.5 ml.) and dry silver oxide (1.5 g.) were added in portions, and the mixture shaken at 20° C. overnight. Residue was centrifuged, washed with dimethylformamide (5 ml.) and chloroform (5 ml.); the centrifugate and washings were treated with 1 percent potassium cyanide solution (50 ml.), and the mixture extracted with chloroform (5 × 10 ml.). The combined extracts were washed with water, dried over sodium sulphate, concentrated to 10 ml., and poured into 100 ml. petroleum ether (B.P. 40–60°). The precipitate was centrifuged, washed with petroleum ether, and dried to a white powder (95.9 mg.). 81.8 mg. of this partially methylated polymer was further methylated with methyl iodide (5 ml.) and silver oxide (1 g.) at 45° C. for 6 hours. The silver residue was filtered, washed with boiling chloroform (3 × 5 ml.) and the filtrate and washings concentrated to 10 ml. and poured into 100 ml. petroleum ether (B.P. 40–60°). The product was methylated again in the same way and finally isolated as a white powder (63.7 mg.). $[\alpha]_D^{19}$ +14.9° in tetrachloroethane (c., 1).

*Analysis.*—The fully methylated polymer $(C_{14}H_{24}O_7)_n$ requires $OCH_3$, 40.80%. Found: $OCH_3$, 36.0.

EXAMPLE 8

Poly(3-O-methacrylol-tri-O-phenylcarbamoyl-D-glucopyranose)

202 mg. of the polymer of Example 3 was dissolved in dimethylformamide (10 ml.). Phenylisocyanate (1 ml.) was added, and the solution was heated at 100° C. for 3 hours. The solution was then poured into 100 ml. ethanol to precipitate the product, which was washed with ethanol and ether and dried. The product was treated again in the same way, and purified by solution in acetone (10 ml.) and reprecipitation in 100 ml. petroleum ether (B.P. 40–60°). The precipitate was finally washed with petroleum ether and dried to a white powder (379 mg.), which analyzed well for the polymer tri(phenylcarbamate). Yield, 76.8%. $[\alpha]_D^{19}$ +25.5° in tetrachloroethane (c., 0.5). The inherent viscosity was 0.32 in tetrachloroethane.

*Analysis.*—$(C_{31}H_{31}N_3O_{10})_n$ requires C, 61.46; H, 5.16; N, 6.94%. Found: C, 60.9; H, 5.10; N, 6.91.

EXAMPLE 9

Poly(3-O-methacrylol-D-glucosephenylhydrazone)

97 mg. of the polymer of Example 3 was dissolved in 10 percent acetic acid (10 ml.) and 1 ml. of freshly distilled phenylhydrazine was added. The yellow-orange colored precipitate, which separated immediately, was centrifuged, washed with 10 percent acetic acid and ethanol and dried (98.9 mg.). Yield, 74.8%.

*Analysis.*—$(C_{16}H_{22}N_2O_6)_n$ requires N, 8.28%. Found: N, 7.62.

EXAMPLE 10

Poly(3-O-methacrylol-D-glucose diphenylformazan)

A solution of phenyldiazonium chloride was prepared in accordance with Mester et al., Jour. Amer. Chem. Soc., 77, 4297 (1955) by dissolving 2.5 g. of freshly distilled aniline in 18 percent (w./w.) HCl (12.5 ml.), cooling the solution to 0 to 5° C., adding 2 g. of sodium nitrite in 4 ml. water dropwise with stirring, and diluting the solution to 25 ml. 1 ml. of this solution was then added dropwise with stirring to 95.7 mg. of the polymer phenylhydrazone of Example 9 in pyridine-ethanol (1:1 by volum; 10 ml.) which was cooled below −5° C. After 10 minutes the bright red precipitate was poured into ice water (60 ml.), and after 20 hours the polymer diphenylformazan was centrifuged, washed with water, and dried to a red powder (122.8 mg.). Yield, 98.1%.

EXAMPLE 11

1,2:5,6-di-O-isopropylidene-3-O-vinyl-α-D-glucofuranose

Diisopropylideneglucose (25 g.), isobutyl vinyl ether (250 ml.), and mercuric acetate (6.25 g.) were refluxed for 6 hrs., and the solution rapidly cooled, washed with three 100 ml. portions of 5% sodium hydroxide solution to remove unreacted diisopropylideneglucose, and dried over sodium sulphate. The solution was concentrated to 20 ml. Petroleum ether (B.P. 60–80°; 100 ml.) was added, and further diisopropylideneglucose was allowed to crystallize out. The filtrate was then treated with ultrasonically dispersed sodium (5 g.) in petroleum ether (80 ml.) under nitrogen for 45 min. to decompose organo-mercury compounds, and the sodium amalgam centrifuged, washed with petroleum ether, and the centrifugate and washings left overnight. A further precipitate was separated, the solution concentrated, and the syrup distilled to give the monomeric product as a colorless oil (4.156 g.). Yield, 15.1%. B.P. 84°/0.05 mm. Hg; $n_D^{19}$ 1.459; $[\alpha]_D$ −26° in ethanol (c., 0.5).

*Analysis.*—Calc. for $C_{14}H_{22}O_6$: C, 58.7; H, 7.75%. Found: C, 38.6; H, 7.5. Infrared analysis showed the characteristic vinyl doublet at 1645 and 1620 cm.$^{-1}$; there was no OH absorption in the infrared. Most of the unreacted diisopropylideneglucose could be recovered from the 5% sodium hydroxide wash liquors by extraction with chloroform to give yields of monomer varying from 50 to 75% in different preparations.

EXAMPLE 12

Poly(1,2:5,6-di-O-isopropylidene-3-O-vinyl-α-D-glucofuranose)

The monomer of Example 11 was redistilled three times from sodium wire just before polymerization. The pure monomer (4.98 g.) was dissolved in methylene chloride (5 ml.) and hexane (15 ml.), the solution cooled to $-78°$ C., and 12 drops of boron trifluoride etherate catalyst added gradually over 80 min. Thirty minutes after the first sign of polymerization, the reaction was stopped by the addition of concentrated ammonia solution (5 ml.) and methanol (50 ml.). The crude polymer was purified by dissolving in chloroform (50 ml.) and pyridine (1 ml.) and slowly adding the filtered solution to stirred methanol (500 ml.). The fibrous polymer was washed with methanol and dried to a white powder (3.85 g.). Yield, 77.4%. $[\alpha]_D +2°$ in tetrachloroethane (c., 0.5); M.P. 210–212°.

Analysis.—$(C_{14}H_{22}O_6)_n$ requires C, 58.7; H, 7.75%. Found: C, 58.7; H, 7.9. The inherent viscosity was 0.65 in tetrachloroethane. The polymer was soluble in chloroform and tetrachloroethane, and insoluble in benzene, ether, dioxan, acetone, ethyl acetate, and water. A carbohydrate vinyl ether has not hitherto been polymerized to a high-molecular-weight linear polymer.

EXAMPLE 13

Poly(1,6-dideoxy-di-O-methylene-1-sebacamido-D-mannitol)

A solution of sebacoyl dichloride (721 mg.; 3.02 mmol.) in 50 ml. CCl$_4$ was added at 20° C. to a rapidly stirred solution of 1,6-diamino-1,6-dideoxy-di-O-methylene - D - mannitol dihydrochloride (836 mg.; 3.02 mmol.) in 0.4 N sodium hydroxide (30.2 ml.; 12.08 mmol.). The resulting polyamide was sequentially washed with 0.1 N HCl, 0.1 N sodium hydroxide, water, alcohol and ether, and dried in vacuo over P$_2$O$_3$ to a white, fibrous product (584 mg.). Yield, 52.2%. $[\alpha]_D^{20} +85°$ in m-cresol (c., 0.5). The inherent viscosity, $\eta_{inh.}$=c.$^{-1}$ ln $(\eta_{soln.}/\eta_{solv.})$, of a solution of the polymer in m-cresol was 0.80 dl./g. (c., 0.5 g./100 ml.; 25°). It melted at 165–175° C. without decomposition and was soluble in dimethylformamide, dimethylsulphoxide, m-cresol, and formic acid.

Analysis.—$(C_{18}H_{30}N_2O_6)_n$ requires N, 7.56%. Found: N, 7.40.

EXAMPLE 14

Poly(1,6-dideoxy-di-O-methylene-1-terephthalamido-D-mannitol)

A solution of pure terephthaloyl dichloride (3 mmol.) in 50 ml. CCl$_4$ was added at 0° to a rapidly stirred solution of 1,6-diamino-1,6-dideoxy-di-O-methylene-D - mannitol dihydrochloride (3 mmol.) in 0.4 N sodium hydroxide (30 ml.; 12 mmol.). The polyterephthalamide was isolated in 78.7% yield as in Example 13. $[\alpha]_D +83°$ in m-cresol (c., 0.5). It melted at 110–230° C. without decomposition and had similar solubility characteristics to the polymer of Example 13. Its inherent viscosity was 0.65 in m-cresol.

Analysis.—$(C_{16}H_{18}N_2O_6)_n$ requires C, 57.5; H, 5.4; N, 8.4%. Found: C, 55.9; H, 5.7; N, 8.1.

EXAMPLE 15

1,6-diamino-1,6dideoxy-di-O-methylene-D-glucitol dihydrochloride 1,6-dichloro-1,6-dideoxy-2,4:3,5-di-O - methylene - D-glucitol (6.7 g.), prepared according to the teachings of Haworth et al., Jour. Chem. Soc., 58 (1944), was heated with 31% (w./v.) aqeous ammonia solution (120 ml.) at 110–115° C. for 24 hr. The solution was evaporated to dryness, the solid dissolved in water (75 ml.), and the solution passed through a column of Amberlite resin IRA–401–OH to remove chloride. The eluate was concentrated, and the crude diamine (5.07 g.) was dissolved in water (10 ml.). Concentrated hydrochloric acid (5.7 ml.) was added at 0°, and crystallization was effected by adding ethanol (20 ml.). The product was recrystallized three times from aqueous ethanol to give 1,6-diamino-1,6-dideoxy-2,4:3,5-di-O-methylene-D - glucitol dihydrochloride (2.17 g.). Yield, 28.4%. $[\alpha]_D +36.8°$ in water (c., 1).

Analysis.—$C_8H_{16}N_2O_4 \cdot 2HCl$ requires C, 34.7; H, 6.54; Cl, 25.6; N, 10.1%. Found: C, 34.2; H, 6.45; Cl, 25.0; N, 9.9.

EXAMPLE 16

Poly(1,6-dideoxy-di-O-methylene-1-sebacamido-D-glucitol)

A solution of sebacoyl dichloride (3 mmol.) in 50 ml. CCl$_4$ was added at 0° to a rapidly stirred solution of the diamine dihydrochloride (3 mmol.) of Example 15 in 0.4 N sodium hydroxide (30 ml.; 12 mmol.). The polyamide was isolated in 55.9% yield as in Example 13. $[\alpha]_D -8\pm2°$ in m-cresol (c., 0.5). It decomposed above 270° without melting. It was insoluble in dimethylformamide, dimethylsulphoxide, and formic acid, and soluble in m-cresol. Its inherent viscosity was 1.20 in m-cresol.

Analysis.—$(C_{18}H_{30}N_2O_6)_n$ requires C, 58.4; H, 8.2; N, 7.6%. Found: C, 57.7; H, 8.2; N, 7.0.

EXAMPLE 17

1,6-diamino-1,6-dideoxy-di-O-methylene-L-iditol 2,4:3,5-di-O-methylene-L-iditol (2 g.), prepared according to Hann, et al., Jour. Amer. Chem. Soc., 67, 602 (1945), was suspended in dry pyridine (17 ml.). Thionyl chloride (10 ml.) was added, and the mixture refluxed at 100° for 30 min. The product was worked up according to the method of Haworth et al., Jour. Chem. Soc., 58 (1944), for the corresponding glucitol derivative. The yellow solid (1 g.) was recrystallized from ethanol (200 ml.), and the crystals extracted with carbon disulfide to remove contaminating sulphur and give pure 1,6-dichloro-1,6-dideoxy-2,4:3,5-di-O-methylene-L-iditol (533 mg.) in 22.5% yield. M.P. 236.5–237°; $[\alpha]_D +64.4°$ in chloroform (c., 1.4).

Analysis.—$C_8H_{16}N_2O_4$ requires C, 39.5; H, 4.98; Cl, 29.2%. Found: C, 39.1; H, 5.17; Cl, 29.3%.

The 1,6-dichloro-1,6-dideoxy-2,4:3,5-di-O - methylene-L-iditol (2.2 g.) was treated with 31% (w./v.) aqueous ammonia (40 ml.) at 110–115° C. for 24 hr. as described in Example 15 for the glucitol derivative, and the crude diamine (1.28 g.) sublimed at 180° C./0.05–0.1 mm. Hg to give pure 1,6-diamino-1,6-dideoxy-2,4:3,5-di-O-methylene-L-iditol (685 mg.) in 37.1% yield. M.P. 210–212° (decomp.); $[\alpha]_D +19°$ in m-cresol (c., 0.5).

Analysis.—$C_8H_{16}N_2O_4$ requires C, 47.1; H, 7.88; N, 13.7%. Found: C, 47.2; H, 7.94; N, 13.5.

EXAMPLE 18

1,6-diamino-1,6-dideoxy-di-O-methylene-L-iditol dihydrochloride

The diamine (1.213 g.) of Example 17 in water (2.5 ml.) was treated at 0° with concentrated hydrochloric acid (1.4 ml.) and ethanol (10 ml.) to give crystalline 1, 6-diamino-1,6-dideoxy-2,4:3,5-di-O-methylene-L-iditol dihydrochloride (832 mg.) in 50.5% yield. $[\alpha]_D +13°$ in water (c., 0.5).

Analysis.—$C_8H_{16}N_2O_4 \cdot 2HCl$ requires C, 34.7; H, 6.54; Cl, 25.6; N, 10.1%. Found: C, 34.3; H, 6.60; Cl, 25.2; N, 9.8.

EXAMPLE 19

Poly(1,6-dideoxy-di-O-methylene-1-sebacamido-L-iditol)

A solution of sebacoyl dichloride (3 mmol.) in 50 ml. CCl$_4$ was added at 0° to a rapidly stirred solution of the diamine dihydrochloride (3 mmol.) of Example 18 in 0.4 N sodium hydroxide (30 ml.; 12 mmol.). The polyamide was isolated in 80.8% yield as in Example 13. $[\alpha]_D -69°$ in m-cresol (c., 0.5). It decomposed above 320° C. without melting. It was sparingly soluble in formic acid and m-cresol, and insoluble in dimethylformamide and dimethylsulphoxide. Its inherent viscosity was 0.91 in m-cresol.

Analysis.—$(C_{18}H_{30}N_2O_6)_n$ requires C, 58.4; H, 8.2; N, 7.6%. Found: C, 57.3; H, 8.2; N, 7.3.

EXAMPLE 20

Poly(1,6-dideoxy-di-O-methylene-1-sebacamidogalactitol)

(1) A solution of sebacoyl dichloride (770 mg.; 3.22 mmol.) in 54 ml. $CCl_4$ was added at 0° C. to a rapidly stirred solution of 1,6-diamino-1,6-dideoxy-di-O-methylenegalactitol (658 mg.; 3.22 mmol.) in 0.2 N sodium hydroxide (32.2 ml.; 6.44 mmol.). The polyamide was isolated in 68.9% yield as in Example 13. The polymer was optically inactive. It melted at 200–206° C. without decomposition and had similar solubility characteristics to the polymer of Example 13. Its inherent viscosity was 0.84 in m-cresol.

Analysis.—$(C_{18}H_{30}N_2O_6)_n$ requires C, 58.37; H, 8.16; N, 7.56%. Found: C, 57.9; H, 8.22; N, 7.75.

(2) A solution of sebacoyl dichloride (760 mg.; 3.18 mmol.) in 50 ml. $CCl_4$ was added at 20° C. to a rapidly stirred solution of 1,6-diamino-1,6-dideoxy-di-O-methylenegalactitol dihydrochloride (880 mg.; 3.18 mmol.) in 0.4 N NaOH (31.8 ml.; 12.72 mmol.). A polyamide having similar properties to that of Example 20(1) was obtained but with a higher inherent viscosity (0.95 in m-cresol).

Analysis.—$(C_{18}H_{30}N_2O_6)_n$ requires N, 7.56%. Found: N, 7.34.

EXAMPLE 21

Poly(1-adipamido-1,6-dideoxy-di-O-methylenegalactitol)

A solution of adipoyl dichloride (256 mg.; 1.40 mmol.) in 25 ml. $CCl_4$ was added at −5° C. to a rapidly stirred solution of 1,6-diamino-1,6-dideoxy-di - O - methylenegalactitol dihydrochloride (388 mg.; 1.40 mmol.) in 0.4 N NaOH (14 ml.; 5.6 mmol.). The polyamide (220 mg.) was isolated in 49.9 percent yield with an inherent viscosity of 0.36 in m-cresol. M.P. 226–235° C.

Analysis.—$(C_{14}H_{22}N_2O_6)_n$ requires N, 8.92%. Found: N, 8.27.

EXAMPLE 22

Poly(1,6-dideoxy-di-O-methylene-1-terephthalamidogalactitol)

A solution of pure terephthaloyl dichloride (3 mmol.) in 50 ml. $CCl_4$ was added at 0° to a rapidly stirred solution of 1,6 - diamino - 1,6 - dideoxy - di - O - methylenegalactitol dihydrochloride (3 mmol.) in 0.4 N sodium hydroxide (30 ml.; 12 mmol.) to give the polyamide in 91.9% yield. It melted at 265–275° without decomposition. It was sparingly soluble in dimethylsulphoxide, formic acid, and m-cresol. Its inherent viscosity was 0.61 in m-cresol.

Analysis.—$(C_{16}H_{18}N_2O_6)_n$ requires C, 57.5; H, 5.4; N, 8.4%. Found: C, 56.5; H, 9.6; N, 8.0.

EXAMPLE 23

1,6-diamino-di-O-benzylidene-1,6-dideoxygalactitol

Dry hydrogen chloride gas was passed through an agitated suspension of 1,6 - dichloro - 1,6 - dideoxygalactitol (6.056 g.), prepared according to the teachings of Butler et al., Jour. Chem. Soc., 636 (1956), in benzaldehyde (42 ml.) for 4 hr. The solid was filtered, washed with petroleum ether and water, and recrystallized twice from ethanol (800 ml.) to give pure di-O-benzylidene-1,6-dichloro-1,6-dideoxygalactitol (5.952 g.) in 54.5% yield. M.P. 153–4°.

Analysis.—$C_{20}H_{20}Cl_2O_4$ requires C, 60.8; H, 5.10; Cl, 17.9%. Found: C, 61.2; H, 5.31; Cl, 18.2.

This dibenzylidenedichlorogalactitol (1.11 g.) was heated at 145–150° C. for 72 hr. with dry methanol saturated with ammonia at 0° C. (80 ml.). The solution was concentrated, the solid dissolved in methanol (60 ml.) and water (30 ml.), and chloride removed with Amberlite resin IRA–401–OH. The eluate and washings were concentrated, and the crude diamine was distilled (bath temp. 250–280° C./0.01 mm. Hg) to give crystalline 1,6-diamino - di - O - benzylidene - 1,6 - dideoxygalactitol in 39.5% yield.

Analysis.—$C_{20}H_{24}N_2O_4$ requires N, 7.86%. Found: N, 7.89.

EXAMPLE 24

Poly(di-O-benzylidene-1,6-dideoxy-1-sebacamidogalactitol)

A solution of the diamine (1.5 mmol.) of Example 23 was dissolved in ethanol (30 ml.), and the solution titrated to pH 6 with 0.1 N hydrochloric acid (30 ml.) to give a solution containing 1.5 mmol. of the diamine dihydrochloride. The solution was concentrated in vacuo at 40° to 20 ml. to remove ethanol, cooled to 0°, a cold solution of sebacoyl dichloride (1.5 mmol.) in $CCl_4$ (50 ml.) was added and followed immediately by the addition of 0.5 N sodium hydroxide (12 ml.; 6 mmol.) and the solutions mixed for 10 min. The polyamide was isolated in 74.5% yield. It melted at 210–220° C. It was soluble in dimethylformamide, dimethylsulphoxide, formic acid, and m-cresol. Its inherent viscosity was 0.41 in m-cresol.

Analysis.—$(C_{30}H_{38}N_2O_6)_n$ requires N, 5.36%. Found: N, 5.23.

EXAMPLE 25

1,6-diamino-1,6-dideoxy-di-O-isopropylidenegalactitol 1,6-dichloro-1,6-dideoxygalactitol (1.008 g.), prepared according to the method of Butler et al., Jour. Chem. Soc., 636 (1956) was shaken at 20° for 19 hours with dry acetone (12.5 ml.) containing 0.1 ml. sulphuric acid. Further acetone (10 ml.) was added, the solution neutralized with anhydrous $Na_2CO_3$, and the filtrate concentrated. The resulting crystalline residue (1.323 g.) was twice recrystallized from 20 ml. petroleum ether (B.P. 60–80°) to give 1,6 - dichloro - 1,6 - dideoxy - di - O isopropylidenegalactitol (862 mg.) in 62.7 percent yield. M.P. 114.5–115° C. Infrared analysis showed the absence of OH absorption.

Analysis.—$C_{12}H_{20}Cl_2O_4$ requires C, 48.16; H, 6.74; Cl, 23.69%. Found: C, 47.7; H, 6.80; Cl 23.77.

This 1,6 - dichlorodiisopropylidenegalactitol (5 g.) was heated with 31 percent (w./v.) aqueous ammonia solution (160 ml.) at 110–115° for 4½ days with occasional shaking. The solution was concentrated to dryness, the residue dissolved in 100 ml. water, and the solution passed through a column (175 ml.) of Amberlite resin IRA–401–OH to remove chloride. The eluate was concentrated in the absence of carbon dioxide and the product distilled to give crystalline 1,6-diamino-1,6-dideoxy-di-O-isopropylidenegalactitol (2.536 g.) in 58.3% yield. B.P. 96–98° C./0.05 mm. Hg; M.P. 69–71° C.

Analysis.—$C_{12}H_{24}N_2O_4$ requires C,55.37; H, 9.29; N, 10.76%. Found: C, 54.8; H, 9.05; N, 11.02.

EXAMPLE 26

Poly(1,6-dideoxy-di-O-isopropylidene-1-sebacamidogalactitol)

A solution of sebacoyl dichloride (3.467 g.; 14.5 mmol.) in 230 ml. $CCl_4$ at 0° was added to a cold solution of the 1,6 - diamino - 1,6 - dideoxy - di - O - isopropylidene galactitol (3.775 g.; 14.5 mmol.) of Example 25 in 0.2 N sodium hydroxide (145 ml.; 29 mmol.), and the solutions were mixed in a macerator for 5 min. The polymer was washed with 0.01 N hydrochloric acid, 0.1 N sodium hydroxide and water. The crude product was extracted with boiling ethanol (115 ml.), and the extract poured into dilute sodium chloride solution (2 l.). The precipitate was washed with water to give the polyamide as a white, fibrous product (3.903 g.). Yield, 63.1%. It melted at 125–135°. It was soluble in ethanol, chloroform, dimethylformamide, dimethylsulphoxide, formic acid, and m-cresol. Its inherent viscosity was 0.94 in m-cresol.

Analysis.—$(C_{22}H_{38}N_2O_6)_n$ requires C, 61.9; H, 9.0; N, 6.6%. Found: C, 61.3; H, 8.9; N, 6.35. The molten polyamide yielded filaments.

EXAMPLE 27

Poly(1,6-dideoxy-1-sebacamidogalactitol),
i.e. tetrahydroxy-nylon

The acetonated polyamide (508 mg.) of Example 26 was deacetonated by heating at 100° C. in a sealed tube for 2 hours with 0.1 N methanolic HCl (30 ml.) containing water (1.5 ml.). The tetrahydroxy-nylon which precipitated was washed with water and dried to a powder (329 mg.; 79.7% yield). This hydroxy-polyamide was infusible and insoluble in the usual polyamide solvents and the exception of formic acid. The inherent viscosity was 0.36 in formic acid.

EXAMPLE 28

Di-O-methylene-D-glucaroyl dichloride

Finely powdered, anhydrous di-O-methylene-D-glucaric acid (5 g.), prepared according to the method of Haworth et al., Jour Chem. Soc., 61 (1944), refluxed for 6 hr. with thionyl chloride (25 ml.), excess thionyl chloride removed in vacuo, the crude acid chloride refluxed with dry carbon tetrachloride (300 ml.), and the insoluble material filtered. On concentration the filtrate gave crystals, which were washed with light petroleum ether to give 2,4:3,5-di-O-methylene-D-glucaroyl dichloride (4.90 g.). Yield, 84.6%. M.P. 70°; $[\alpha]_D$ +73.5° in benzene, +66.5° in m-cresol (c., 1).

Analysis.—$C_8H_8Cl_2O_6$ requires C, 35.4; H, 2.97; Cl, 26.15%. Found: C, 35.7; H, 3.08; Cl, 26.1.

EXAMPLE 29

Poly(hexamethylene-di-O-methylene-D-glucaramide)

A solution of the diacid chloride (3 mmol.) of Example 28 in 75 ml. $CCl_4$ was added at 0° to a rapidly stirred solution of hexamethylenediamine (3 mmol.) in 0.2 N NaCH (30 ml.; 6 mmol.). The crude product was purified by dissolving in 25 ml. dimethylformamide and pouring the filtered solution into saturated NaCl solution (100 ml.). The precipitate was washed thoroughly with water to give a tough, rubbery polyamide in 68.2% yield. $[\alpha]_D$ +56° in m-cresol (c., 0.5). It decomposed above 270° without melting. It was soluble in chloroform, dimethylformamide, dimethylsulphoxide, formic acid and m-cresol. Its inherent viscosity was 1.08 in m-cresol.

Analysis.—$(C_{14}H_{22}N_2O_6)_n$ requires C, 53.5; H, 7.1; N, 8.9%. Found: C, 51.6; H, 7.2; N, 8.4.

EXAMPLE 30

Di-O-methylene-L-idaroyl dichloride

Finely powdered, pure di-O-methylene-L-idaric acid (5.01 g.), prepared in accordance with Haworth et al., Jour. Chem. Soc., 61 (1944), was refluxed with pure thionyl chloride (100 ml.) for 5 hrs., the mixture cooled, dimethoxyethane (100 ml.) added with cooling, and refluxing continued until the acid dissolved. The hot solution was filtered, and the filtrate cooled to 0° to give crystalline 2,4:3,5-di-O-methylene-L-idaroyl dichloride (4.49 g.). Yield 77.5%. M.P. 217–220° C.; $[\alpha]_D$ +135° in benzene (c., 0.2), +143° in m-cresol (c., 0.5).

Analysis.—$C_8H_8Cl_2O_6$ requires C, 35.4; H, 2.97; Cl, 26.15%. Found: C, 35.5; H, 3.31; Cl, 26.0.

EXAMPE 31

Poly(hexamethylene-di-O-methylene-L-idaramide)

A solution of the diacid chloride (4.352 g.; 16.05 mmol.) of Example 30 in 400 ml. methylene chloride was added at 20° C. to a solution of hexamethylenediamine (1.865 g.; 16.05 mmol.) in 0.2 N NaOH (160 ml.; 32 mmol.) and the solutions mixed in a high-speed macerator. The polyamide (2.821 g.; 55.9% yield) was obtained as a white fluffy, fibrous material with a very high specific rotation ($[\alpha]_D^{19}$ +284° in m-cresol; c., 0.5). The polymer did not melt below 320° C. Its inherent viscosity was 0.95 in m-cresol.

Analysis.—$(C_{14}H_{22}N_2O_6)_n$ requires C, 53.5; H, 7.1; N, 8.9%. Found: C, 52.8; H, 7.2; N, 8.7.

EXAMPLE 32

Poly(decamethylene-di-O-methylene-L-idaramide)

A solution of the diacid chloride of Example 30 in methylene chloride was added to a solution of decamethylenediamine in 0.2 N NaOH as described in Example 31 to give a polyamide in 48.6% yield having an inherent viscosity of 0.73 in m-cresol. $[\alpha]_D$ +238° in m-cresol (c., 0.5). The polyamide decomposed above 320° C. without melting.

Analysis.—$(C_{18}H_{30}N_2O_6)_n$ requires C, 58.4; H, 8.2; N, 7.6%. Found: C, 57.7; H, 8.2; N, 7.3.

EXAMPLE 33

Poly(hexamethylene-di-O-methylenegalactaramide)

A solution of di-O-methylenegalactaroyl dichloride (19 g.; 70.1 mmol.) in 1170 ml. $CCl_4$ was added to a solution of hexamethylenediamine (8.143 g.; 70.1 mmol.) in 0.5 N NaOH (280 ml.; 140 mmol.) and the solutions mixed in a high-speed macerator. The polyamide (17.05 g.; 77.4% yield) was obtained as a white product, which melted at 200–210° C. to a viscous liquid. Its inherent viscosity was 0.97 in m-cresol.

Analysis.—$(C_{14}H_{22}N_2O_6)_n$ requires C, 53.5; H, 7.1; N, 8.9%. Found: C, 53.3; H, 7.2; N, 8.75.

EXAMPLE 34

Poly(hexamethylene tetra-O-acetylgalactaramide)

A solution of tetra-O-acetylgalactaroyl dichloride (631 mg.; 1.52 mmol.) in 25 ml. $CCl_4$ was added at 20° C. to a rapidly stirred solution of hexamethylenediamine (176 mg.; 1.52 mmol.) in 0.2 N NaOH (15.2 ml.; 3.04 mmol.). The polyamide (279 mg.; 39.9% yield) was obtained as a white, free-flowing powder with an inherent viscosity in m-cresol of 0.34. The polymer, which is tetraacetoxy-nylon, was optically inactive.

Analysis.—$(C_{20}H_{30}N_2O_{10})_n$ requires C, 52.4; H, 6.60; N, 6.1%. Found: C, 52.3; H, 6.77; N, 6.2.

EXAMPLE 35

Poly[1,6-dideoxy-di-O-methylene-1-(di-O-methylene-galactaramido)-galactitol]

A solution of di-O-methylenegalactaroyl dichloride (3 mmol.) in 50 ml. $CCl_4$ was added at 0° to a rapidly stirred solution of 1,6-diamino-1,6-dideoxy-di-O-methylenegalactitol dihydrochloride (3 mmol.) in 0.4 N NaOH (30 ml.; 12 mmol.). The polyamide was obtained as a white powder in 24.1% yield having an inherent viscosity of 0.39 in m-cresol. The polymer was optically inactive.

Analysis.—$(C_{16}H_{22}N_2O_{10})_n$ requires C, 47.8; H, 5.5; N, 7.0%. Found: C, 47.4; H, 5.7; N, 6.6.

We claim:
1. Poly(1,2:5,6-di-O-isopropylidene-3-O-methacryloyl-α-D-glucofuranose.
2. Poly(3-O-methacryloyl-D-glucopyranose).
3. Poly(3-O-methacryloyl-D-glucitol).
4. A member selected from the group consisting of poly(3-O-methacryloyl-D-gluconic acid) and the sodium salt thereof.
5. Poly(1,2,4,6-tetra-O-acetyl - 3 - O - methacryloyl-D-glucopyranose).
6. Methylated poly(3 - O - methacryloyl-D-glucopyranose).
7. A process of preparing the homopolymer of 1,2:5,6 - di - O - isopropylidene-3-O-methacryloyl-α-D-glucofuranose comprising polymerizing a benzene solution of 1,2:5,6-di-O-isopropylidene-3-O-methacryloyl-α-D-glucofuranose at 70° C. under nitrogen in the presence of azobisisobutyronitrile, and precipitating the homopolymer with methanol.

8. A process of preparing poly(3-O-methacryloyl-D-glucopyranose) comprising subjecting the homopolymer of 1,2:5,6-di-O-isopropylidene-3-O-methacryloyl - α - D-glucofuranose to hydrolysis at 100° C. with 1 N HCl.

9. A process of preparing poly(3-O-methacryloyl-D-glucitol) comprising subjecting poly(3-O-methacryloyl-D-glucopyranose) to reduction for 23 hrs. at 20° C. with an aqueous solution of sodium borohydride, acidifying with acetic acid, concentrating the solution, and precipitating the reduced polymer with methanol.

10. A process of preparing poly(3-O-methacryloyl-D-gluconic acid) comprising subjecting a solution of poly (3-O-methacryloyl-D-glucopyranose) in 4 M acetic acid to oxidation for 26 hrs. at 20° C. with sodium chlorite.

11. A process of preparing poly(sodium 3-O-methacryloyl-D-gluconate) comprising dissolving poly(3-O-methacryloyl-D-gluconic acid) in 0.01 N sodium hydroxide neutralizing with sulfuric acid, and dialyzing to remove the resulting sodium sulfate.

12. A process of preparing poly(1,2,4,6-tetra-O-acetyl-3-O-methacryloyl-D-glucopyranose) comprising subjecting a dimethylformamide solution of poly(3-O-methacryloyl-D-glucopyranose) to acetylation with acetic anhydride at 20° C. in the presence of pyridine and precipitating the product by pouring into water.

13. A process of preparing the methyl ether of poly(3-O-methacryloyl-D-glucopyranose) comprising subjecting a dimethylformamide solution of poly(3-O-methacryloyl-D-glucopyranose) to methylation at 20° C. with methyl iodide and silver oxide.

No references cited.

JOSEPH L. SCHOFER, *Primary Examiner.*

H. WONG, *Assistant Examiner.*

U.S. DEPARTMENT OF COMMERCE
PATENT OFFICE
Washington, D.C. 20231

UNITED STATES PATENT OFFICE
CERTIFICATE OF CORRECTION

Patent No. 3,400,107                    September 3, 1968

William A. P. Black et al.

It is certified that error appears in the above identified patent and that said Letters Patent are hereby corrected as shown below:

Column 4, line 30, "7.25" should read -- 7.35 --. Column 6, line 62, "38.6" should read -- 58.6 --.

Signed and sealed this 17th day of February 1970.

(SEAL)
Attest:

Edward M. Fletcher, Jr.                 WILLIAM E. SCHUYLER, JR.
Attesting Officer                          Commissioner of Patents